(12) United States Patent
Zhuang (10) Patent No.: US 10,944,746 B1
(45) Date of Patent: Mar. 9, 2021

(54) SYSTEM AND METHOD FOR USING INTERNET OF THINGS ENABLED EMAIL ADDRESS (IOTEEA)

(71) Applicant: Min Zhuang, Apple Valley, MN (US)

(72) Inventor: Min Zhuang, Apple Valley, MN (US)

(*) Notice: Subject to any disclaimer, the term of this patent is extended or adjusted under 35 U.S.C. 154(b) by 0 days.

(21) Appl. No.: 16/584,640

(22) Filed: Sep. 26, 2019

(51) Int. Cl.
*H04L 29/06* (2006.01)
*G06F 11/36* (2006.01)
*H04L 29/08* (2006.01)
*H04L 12/58* (2006.01)

(52) U.S. Cl.
CPC ...... *H04L 63/0876* (2013.01); *G06F 11/3664* (2013.01); *H04L 51/22* (2013.01); *H04L 67/12* (2013.01); *H04L 67/306* (2013.01); *H04L 67/02* (2013.01)

(58) Field of Classification Search
CPC .................................................. H04L 63/0876
USPC ............................................................ 726/6
See application file for complete search history.

(56) References Cited

U.S. PATENT DOCUMENTS

| | | | |
|---|---|---|---|
| 9,054,961 B1 | 6/2015 | Kim | |
| 9,712,486 B2 | 7/2017 | Johnson | |
| 2015/0230167 A1* | 8/2015 | Choi | H04W 12/06 455/411 |
| 2016/0087933 A1* | 3/2016 | Johnson | H04W 12/0023 709/245 |
| 2016/0112262 A1* | 4/2016 | Johnson | H04L 61/1511 709/221 |
| 2017/0083386 A1* | 3/2017 | Wing | G06Q 10/10 |
| 2018/0288173 A1* | 10/2018 | Schacht | G06F 16/958 |

* cited by examiner

*Primary Examiner* — Sheree N Brown (57) ABSTRACT

A method for integrating an email system based on Internet of Things Enabled Email Address (IoTEEA) with IoT devices to establish a standard. According to embodiments of the invention, a method for creating an email account, installing IoTEEA into the IoT device memory, connecting the IoT device to the email account by the information from IoTEEA, using IoTEEA to claim the ownership of the IoT device, gathering data, encrypting the data, and sending the data to the email account sub folder by the IoT device, decrypting the data by the IoTEEA owner, analyzing the data, providing controller, transferring the ownership of the IoT device to another owner from the email account, and making minimal configuration as Plug and Play.

9 Claims, 9 Drawing Sheets

SYSTEM AND METHOD FOR USING INTERNET OF THINGS ENABLED EMAIL ADDRESS (IOTEEA)

FIELD OF THE INVENTION

This invention relates to electronic communication systems and more particularly to method and system for integration of the Internet of Things Enabled Email Address (IoTEEA) email system and IoT devices.

DESCRIPTION

Background

The present disclosure relates to IoT devices, and more particularly to using Internet of Things Enabled Email Address (IoTEEA). The basic functions of the Internet of Things (IoT) devices are to collect and exchange data through Internet. Based on these data collected, the other IoT devices, back end controllers, or the device owners may issue commands to the devices.

IoT devices are still a very new technology, and there's no single standard for integrating all of IoT devices so that you can control them from one Web application.

People like a smart home. Instead of buying all devices with a central controller from one vendor costly, majority people prefer a more user-friendly piecemeal approach by buying individual smart home devices from different vendors and integrating them together. It is very hard to manage dozens or hundreds IoT devices including smart appliances, security cameras, smart smoke detectors, air quality monitors, thermostats, lights, smart window glasses, motorized curtains and blinds, smart garage door opener, and many other smart devices. When keeping the data and status in the cloud, you will have a lot of user names, passwords and icons that need to be managed. Worse, when you try to sell your house, transferring all your smart devices in your house to the new owner is really a huge task.

Medical, enterprise, and industrial IoT devices are in an even large scale. Encryption is very important to keep data security. Device management is a larger role in any business applications to reducing the need for IT staff to physically have to touch a device. For medical IoT devices, keeping all monitoring device records straight is also very hard when a patient being transferred among the intensive care unit (ICU), the emergency room (ER), and the operation room (OR).

Currently, IoT system builders can pick from a huge range of devices, from simple sensors, motors and individual devices through to complete systems with artificial intelligence. The list is almost endless that creates a headache to make different devices work together with many of which work in subtly different ways.

For the IoT developers, developing the entire system is hard and not necessary because a lot of tasks, such as how to connect to internet, how to use the REST API, how to encrypt data, how to display data to the user, and others, duplicate each other's efforts. The skills necessary to successfully design and implement an IoT solution are beyond the capabilities of most companies.

As increasingly more IoT devices are created by worldwide developers, a simple, cost effective, user friendly, no vendor lock-in, and very secure IoT environment and a standard for interconnecting billions of devices are urgently needed.

IoTEEA will be the single standard for integrating all of IoT devices over HTTP under the control of one Web application that also can support Message Queuing Telemetry Transport (MQTT).

SUMMARY OF THE INVENTION

The present disclosure provides the method and system with Internet of Things Enabled Email Address (IoTEEA) to address the aforementioned issues.

When a user first opens a new email account in an IoTEEA email system, either on-premises or in cloud, two different keys (public & private) are generated. Public-key cryptography uses a two-key system, consisting of the public and the private keys, where messages are encrypted with the public key and decrypted with the private key for establishing an end-to-end encryption (E2EE) secure communication channel between the email user and among IoT devices that the user owns. First, the user uses the IoTEEA generator of the email system to create a new IoTEEA for the device. Second, the user enters IoTEEA into the IoT device memory. When the IoT device automatically connects with user's email account default HTTP email port by using IoTEEA to extract domain, user email account, and sub directory information, the user becomes the IoT device owner after user's approval. The user then will receive device data or issue commands to the IoT device through the email account.

IoTEEA concatenates the device owner's email address, device sub folder, and varieties of information and/or commands into one single string, such as the device name, owner's encrypting public key, forwarding email addresses, keys, emergency notifications, device default controller, and other information. The owner's email address claims the ownership of this device and also provided the web address for the data collected from the device. The concatenated information is separated by appropriate delimiters or XML tags. Any IoTEEA is a string that can be easily converted to a QR code for scanning. This IoTEEA resides in the IoT device memory and is protected by the two-factor verification to prevent from unauthorized changes. The two-factor authentication requires secondary authentication that is an one-time code sent via the IoTEEA email before access is granted. The IoT device manufacturers can decide the actual IoTEEA compliant format and information needed for their IoT devices.

For example, the following valid IoTEEA items can be used for the IoT devices:

1) my.name@1kiot.com@@/iot/home/kitchen/refrigerator
2) my.name@1kiot.com@@/iot/home/kitchen/refrigerator@@@<publickey>QUABA4GMADC....5Ulsyus</publickey>

The first example IoTEEA above in item 1 is the IoT device name. It is also the unique email address for this particular IoT device. Every IoT device in the world can have an easy to remember unique email address IoTEEA for communication and device management.

The delimiters used in the above examples are "@@" and "@@@". The email account (device owner) email address part is before "@@", the device data path part "/iot/home/kitchen/refrigerator" is after "@@". Each email account has a default directory to store data from the IoT device. If the device data path does not exist in the owner's email account, it will be generated automatically by the email system. In the same time, several additional sub directory may also created under the data path. The IoT device data path is organized in a tree structure under the root directory/iot. The IoT device (in this example, the refrigerator) IP address can be store in the default/ip sub directory, such as /iot/home/ kitchen/refrigerator/ip. The refrigerator's public cryptographic key is stored under the folder/iot/home/kitchen/ refrigerator/key for the user to issue encrypted commands to the device. The third sub folder is/controller, such as iot/ home/kitchen/refrigerator/controller, that is for store the default controller model name developed by the IoT device manufacturer or other software developers. The <public key> in the second sample is the email account's public cryptographic key for the IoT device to encrypt data.

The email system provides a Web page, known as IoTEEA generator, to help creating IoTEEA and converting it to QR code, after the email user has entered required information and made choices.

The email system based on IoTEEA opens to all vendors to market their devices and develop software controllers. In the same time, it also opens to all users with one standard that will make vendor lock-in unnecessary.

Because IoTEEA may contain additional IoT device and owner information, the email system can not use the traditional email delivery system based on protocols POP3, IMAP, SMTP nor the default email ports. Instead, it can use HTTP over TCP on a Web server that adheres to the standard request response model for both emails and IoT data and uses the HTTP ports. For a period of time, two email systems can co-exist in the same domain and the same email address can be used in either email system. Eventually, the IoTEEA email system will replace the traditional email system caused by IoT device integration and elimination of spam emails.

The IoT device designers, manufacturers, and vendors may develop their own controllers to display data, report status, or issue commands. These custom controllers can be easily developed and loaded to the email system using a developer email account. In addition, IoT device common routines, such as parsing IoTEEA, extracting the email address, extracting the encryption public key, extracting other information, encrypting data, sending data, and other routines, can be downloaded from free public libraries by the IoT device developers to save software development costs. In addition, the email users can use OAuth to grant limited access to their IoT device data in the email account to other Web sites for analysis, without having to expose their credentials.

When sending statuses, data, photos, and/or videos to the email account, the IoT devices always start the message with an IoTEEA to let the email system find the correct email box and sub directory. IoTEEA can also carry additional information, such as a security alert message, my.name@1kiot.com@@/iot/home/security/ smokedetector@@@<emergency>fire</emergency>. Once the email system receives the message with <emergency> tag, it will take immediate action to notify the email account owner and authorities.

The email system will stop the IoT devices from sending data if the user email account storage is over limit except emergency messages.

If the IoT device manufacturers allow online order of personalized IoT devices, customers may enter IoTEEA, WiFi name, and password through SSL security line to make the devices truly plug and play for automatically connecting to WiFi network and the email account.

IoTEEA defines the email account and sub directory for data. For security reason, the IoT device still may need the email user's manual approval when the IoT device connects to the email account very first time.

According to one embodiment, a method comprises opening an email account in the email system that supports IoTEEA and public key cryptography by a user. The method further comprises entering an IoTEEA into IoTEEA compliant IoT device, a smart refrigerator by the user such as my.name@1kiot.com@@/iot/home/kitchen/refrigerator after the device connecting to the user's home WiFi network. The method further comprises using the information on IoTEEA to automatically report the device IP address and device public cryptographic key to the email account then receive the email account public cryptographic key. The method further comprises encrypting the device status with the email account's public cryptographic key. The method further comprises sending the encrypted status to the designated directory under the email account by the IoT device, the refrigerator. The method further comprises reading the status via a default controller provided by the email system after decrypt the status with the email account private cryptographic key by the user.

In a hospital, there are many monitoring devices, such as blood pressure monitor, heartbeat monitor, blood oxygen level monitor, and other monitors. In addition to the hospital monitoring records, patients also want to get the same medical records with IoTEEA.

According to another embodiment, a method comprises checking into a hospital by a patient. The method further comprises concatenating hospital's email address and other information to create an IoTEEA then converting it to a QR code by the hospital receptionist according to patient's input or records in the hospital, such as records@myHospital.com@@/iot/medical/records/ myHospitalId@@@<forward>myHospital@centrolMedic- alRecords.com@@/iot/medical/records/myHospitalId</ forward><patient>myName@1kIoT.com@@/iot/medical/ records/myHospitalId</patient>. The method further comprises scanning the QR code by a nurse. The method further comprises processing the QR code to have IoTEEA to be set correctly in IoT monitoring devices that will be used with the patient by the hospital email system. The method further comprises creating necessary directories in the hospital email account by the email system. The method further comprises displaying patient's photo to the screen for preventing human error if necessary. The method further comprises reporting all monitoring device statuses to the email accounts of the hospital medical records, the central medical records, and the patient medical records by the IoT monitoring devices according to IoTEEA. The method further comprises rapidly changing the IoTEEA and monitoring status reporting structure if another patient's QR code has been scanned.

According to another embodiment, a method comprises setting a robot arm with IoTEEA by a robot arm operator including the robot arm operator's email address, robot name (robot data directory in the robot arm operator email account), email account's public cryptographic key, such as robotArmOperator@myFactory.com@@/iot/production/ro- bot/myRobotArmId@@@<publicKey>myPublicKey</ publicKey>. The method further comprises connecting the robot arm to Internet by the robot arm operator. The method further comprises automatically posting a ready status, the robot arm's IP address and the robot arm's public cryptographic key over HTTP to the robot arm operator's email account by the robot arm. The method further comprises returning encrypted commands through the email account by the robot arm operator. The method further comprises displaying the process to the robot arm operator. The robot arm may need to change to other task to make completely different things. With IoTEEA, it can be changed to another robot arm operator's email account to receive new instruction after security authentication.

According to another embodiment, a method comprises entering IoTEEA into a drone controlling software on a mobile phone by a user, such as myName@kiot.com@@/iot/devices/drone/myDroneId. The method further comprises reporting IP address and exchanging the public cryptographic keys to complete the setup. The method further comprises sending encrypted videos to the user's email account by the drone controlling software.

According to another embodiment for smart home, a method comprises entering IoTEEA into a newly purchased dishwasher by a home owner, such as myName@1kiot.com@@/iot/home/kitchen/dishwasher, The method further comprises connecting to the home owner's email account automatically by the dishwasher according to IoTEEA. The method further comprises exchanging the public cryptographic keys between the dishwasher and the home owner's email account and reporting device IP address to complete the setup. In case of the house is sold to another person, simply changes the IoTEEA in the dishwasher to the new home owner's email address information by the original home owner to let the new owner customize the rest of information.

According to another embodiment, a method comprises entering an IoTEEA, such as myName@1kiot.com@@/iot/auto/ford, into a car connected to internet by a car owner. The method further comprises exchanging the public cryptographic keys and reporting the car device IP address to complete the setup between the smart car and the car owner's email account. The method further comprises sending a complete status report from all car systems to the car owner's email account by the smart car. Then the car owner can decide whether to automatically forward the data collected from the car to the car repair shop.

According to another embodiment for smart office, a method comprises entering IoTEEA, such as secretary@newspaper1234.com@@iot/sales/printer1 into a laser printer connected to the company intranet by a technician. The email address in the IoTEEA belongs to the department secretary. The method further comprises exchanging the public cryptographic keys automatically between the printer and the secretary's email account and reporting the printer device IP address to complete the setup. The method further comprises sending a status report from the printer to the secretary's email account by the printer device such as a printer toner low message.

According to another embodiment for wearable devices, a method comprises entering IoTEEA, such as myName@1kiot.com@@iot/devices/watch/myWatch into a wearable device connected to internet or wearable device software on a mobile phone by a person. The method further comprises reporting device IP address and exchanging the public cryptographic keys to complete the setup between the wearable device and the person's email account. The method further comprises sending status reports and videos as RESTful resources by using RESTful API from the device to the person's email account.

According to another embodiment for home security, a method comprises entering IoTEEA such as myName@1kiot.com@@/iot/home/security/camera1 into a security camera connected to internet by a home owner. The method further comprises exchanging the public cryptographic keys and reporting device IP address to complete the setup between the security camera and the home owner's email account. The method further comprises sending video from the security camera to the home owner's email account when the AI powered camera identifies a security situation.

The present disclosure provides several important technical advantages. One advantage is that the IoT device developers can focus their development efforts on the device functions and just use standardized RESTful API to send the device data as RESTful resources to REST based IoTEEA email system on a Web server over HTTP. Another advantage is that a standard for interconnecting billions IoT devices will be established. All IoT devices will have an easy-to-remember email address (or name) under a Web RESTful email application server that can co-exist with traditional email server in each domain. Other advantages include rapidly changing IoT device ownership from the email account that makes transferring ownership of smart homes, smart cars, and/or smart devices very easy.

BRIEF DESCRIPTION OF THE DRAWINGS

The accompanying drawings of the IoTEEA email system configuration and flowchart illustrate several embodiments of the invention and together with the description serve to explain the principles of the invention. The invention is not limited to the precise arrangements and instrumentalities shown.

DETAILED DESCRIPTION

The present invention is the method for using Internet of Things Enabled Email Address (IoTEEA) to manage IoT devices from the email account. In the following detail descriptions, for the purposes of explanation, specific descriptions are set forth in order to provide a thorough understanding of embodiments of the invention. The various embodiments may be built without these specific details. Both figures and descriptions are not intended to be restrictive and not intended to limit the scope or configuration of the disclosure. Embodiments will provide those skilled in the art with an enabling description for implementing an exemplary embodiment.

Figure 1:
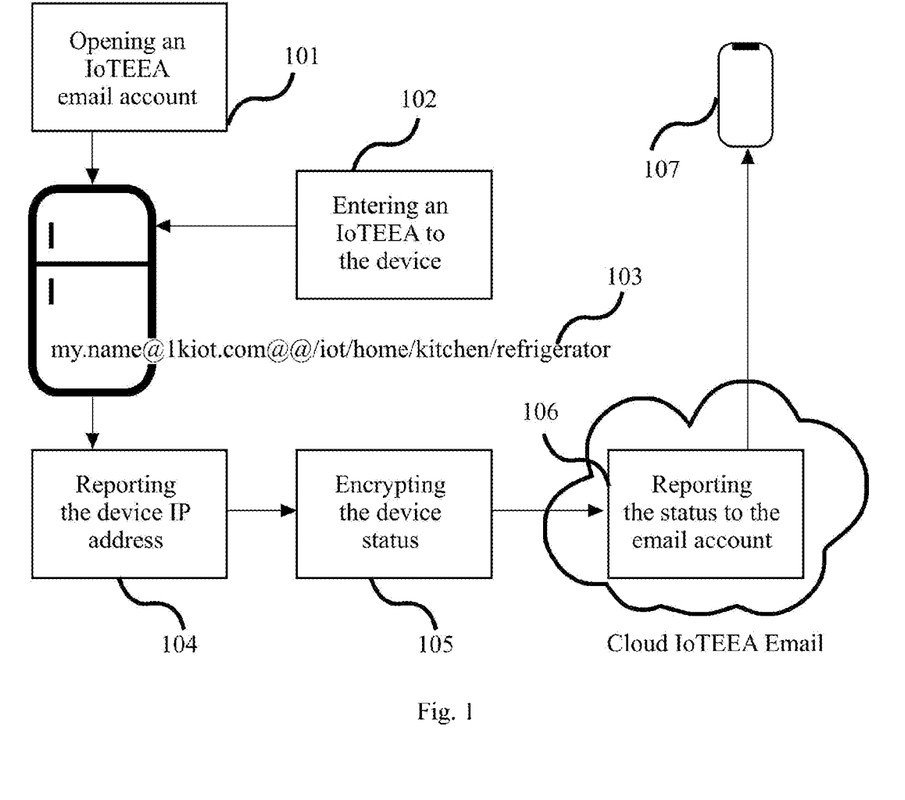
FIG. 1 illustrates the IoTEEA email system configuration.

FIG. 1 is a schematic illustration of the method for integrating an IoT device. According to an embodiment of the present invention that comprises opening an email account in the IoTEEA email system by a user in step 101. Two different keys (public & private) are generated. Public-key cryptography uses a two-key system, consisting of the public and the private keys, where messages are encrypted with the public key and decrypted with the private key for establishing an end-to-end encryption (E2EE). The method further comprises entering an IoTEEA into an IoTEEA compliant IoT device, smart refrigerator in step 102 by the user such as my.name@1kiot.com@@/iot/home/kitchen/refrigerator 103 after the device connecting to the user's home WiFi network. The method further comprises automatically using the information on IoTEEA to automatically report the device IP address and IoT device's public cryptographic key to the email account then receive the email account's public cryptographic key in step 104. The method further comprises encrypting the device status with the email account's public cryptographic key in step 105. The method further comprises sending the encrypted status to the designated directory under the email account by the device in step 106. The method further comprises reading the status via a default controller provided by the email system after decrypting the status with the email account private cryptographic key by the user in step 107.

Figure 2:
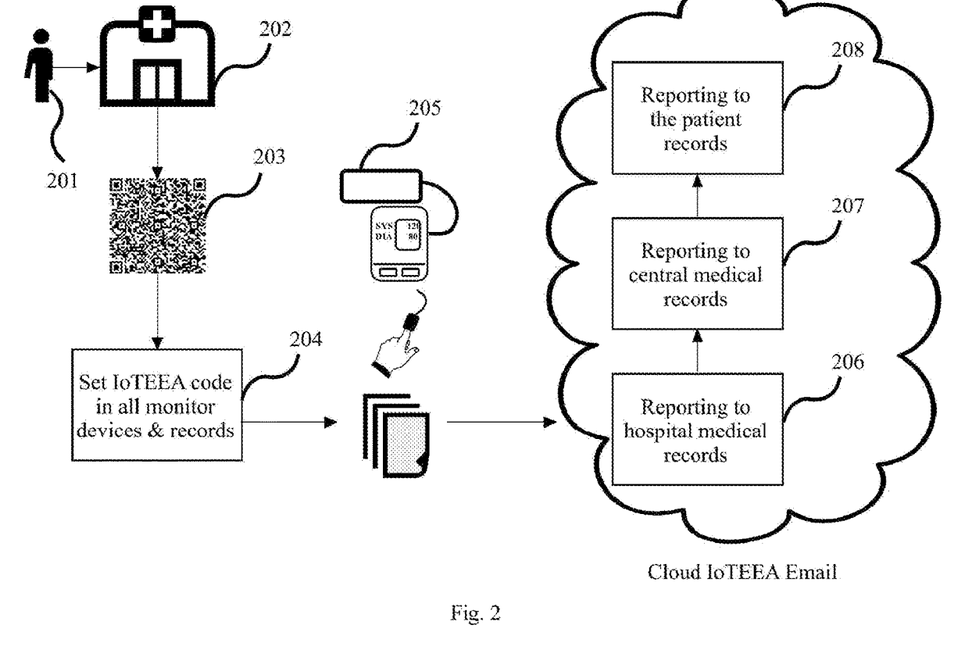
FIG. 2 shows a flowchart for medical IoT devices using scanned IoTEEA.

FIG. 2 is a schematic illustration of the method for Internet of Medical Things. According to another embodiment, a method comprises checking in to a hospital 202 by a patient 201. The method further comprises creating an IoTEEA QR code by the hospital receptionist according to patient's input or patient's record in the hospital started with hospital's email address such as records@myHospital.com@@/iot/medical/records/myHospitalId@@@<forward>myHospital@centrolMedicalRecords.com@@/iot/medical/records/myHospitalId</forward><patient>myName@1kIoT.com@@/iot/medical/records/myHospitalId</patient> (QR code content 203). The <forward> tag is for the central medical records and the <patient> tag is to give the patient a copy. The method further comprises scanning the QR code by a nurse. The method further comprises processing the QR code to have the IoTEEA to be set correctly in each monitoring device, medical record, and test result that used by the patient and creating necessary directories by the email system in step 204. The email address in the beginning of the IoTEEA indicates the owner of this device is the hospital. The next part "@@/iot/medical/records/myHospitalId" is the patient's directory for the device. Because the monitoring devices are shared by many patients, each directory name is changed frequently. The scanner controls a group of devices. Once scanned the QR code, the hospital scanner software will parse the QR code string and concatenate the device actual name, such as "/ICU/BP/2019.09.18" for the intensive care unit's blood pressure monitor 205 and today's date, to make entire directory as "@@/iot/medical/records/myHospitalId/ICU/BP/2019.09.18, then update the blood pressure monitoring device with the new IoTEEA to make the device report data to a correct folder. Since the hospital email account is the owner of this device and the owner remains the same for all the patients, it can change other contents without two-factor authentication nor any human intervention. It will do the same changes to other two record directories, the central medical records and patient's records. The method further comprises displaying patient's photo to prevent human error if necessary. The method further comprises reporting all monitoring device statuses to the email accounts of the hospital medical records 206, the central medical records 207, and the patient medical records 208 by the monitoring devices.

Figure 3:
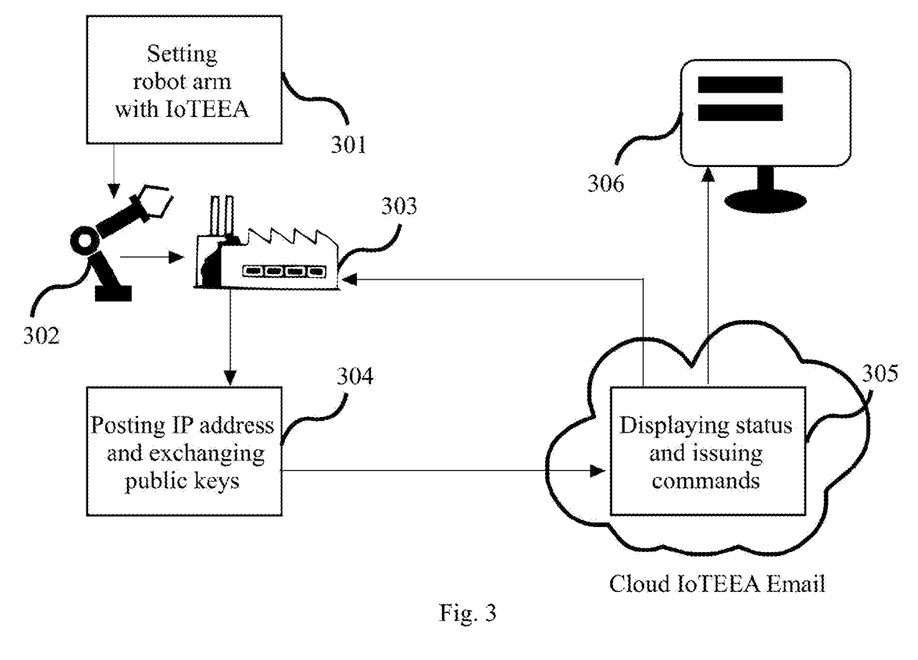
FIG. 3 illustrates the IoTEEA email system for industry automation.

FIG. 3 is a schematic illustration of the method for Internet of Industrial Things. According to another embodiment, a method comprises setting the robot arm by a robot arm operator with IoTEEA including the robot arm operator email address, robot name (robot data directory in the robot arm operator email account), robot arm operator public cryptographic key, such as robotArmOperator@myFactory.com@@/iot/production/robot/myRobotId@@@<publicKey>myPublicKey</publicKey> 301. The method further comprises plugging the robot arm 302 into electric outlet and connecting the robot arm to Internet in the factory 303 by the robot arm operator. The method further comprises automatically posting a ready status, the robot arm's IP address and the robot arm's public cryptographic key over HTTP to the robot arm operator's email account by the robot arm, in step 304. The method further comprises returning encrypted commands through the email account by the robot arm operator. The method further comprises displaying 305 the process to the robot arm operator 306. The robot arm may need to change to other task to make completely different things by download new instructions from the email account or even need to be changed to another email address to move to a new department. With IoTEEA, it can be easily changed to another email account after security authentication by the original email account owner.

Figure 4:
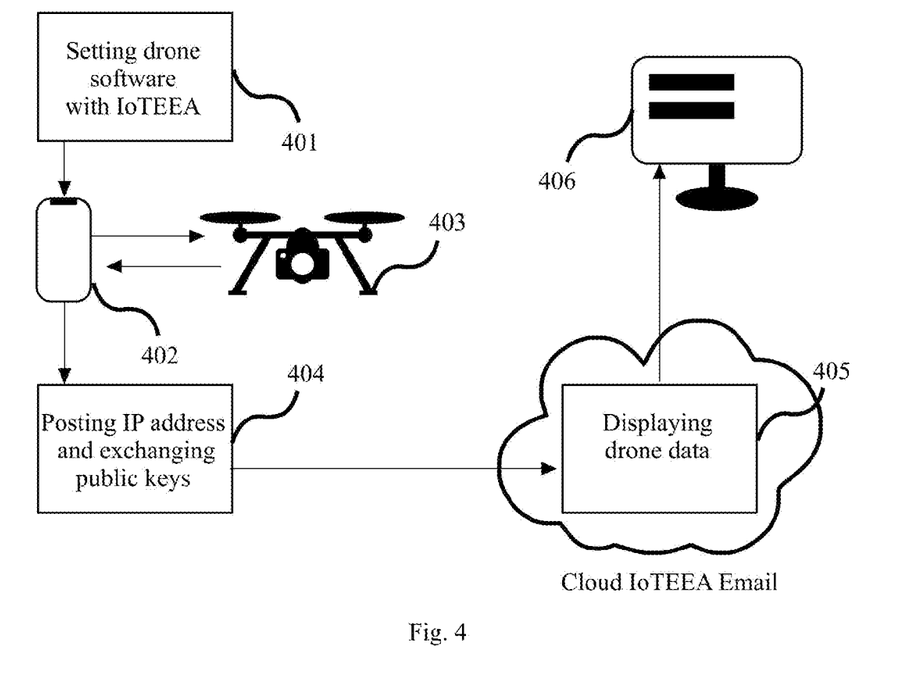
FIG. 4 shows a flowchart for a drone devices system configuration.

FIG. 4 is a schematic illustration of the method for smart robotic aircraft. According to another embodiment, a method comprises entering IoTEEA 401, such as myName@1kiot.com@@/iot/devices/drone/myDroneId into a drone controlling software 402 that is a mobile phone application running on a mobile phone to control the drone 403 by a user. The method further comprises exchanging the public cryptographic keys between the drone controlling software and user's email account to complete the setup 404. The method further comprises sending encrypted status and videos to the user's email account 405 in the cloud by the drone controlling software. The method further comprises displaying videos 406 from the email account after decryption.

Figure 5:
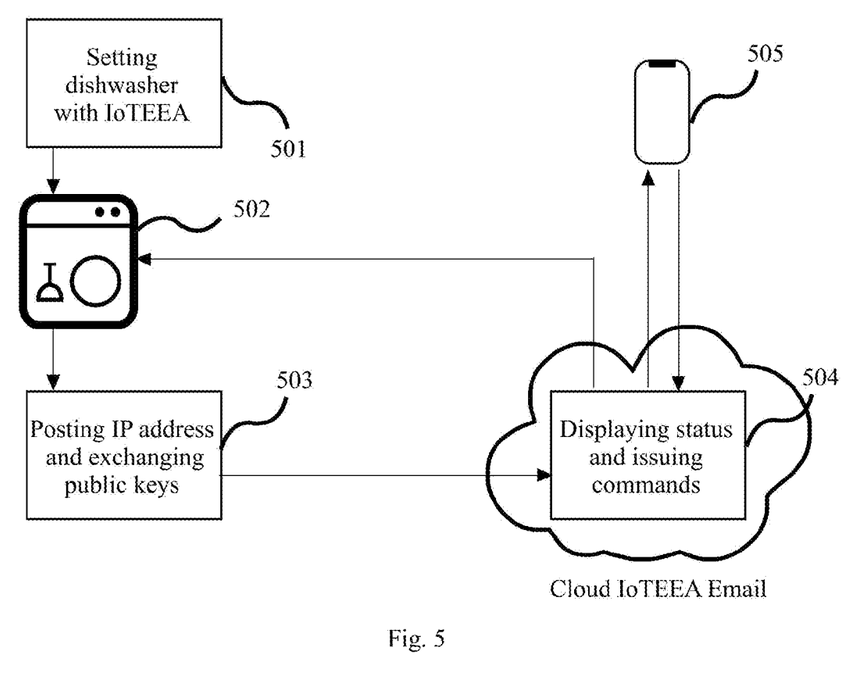
FIG. 5 illustrates how a dishwasher can benefit from the IoTEEA email system.

FIG. 5 is a schematic illustration of the method for the home sector. According to another embodiment for smart home, a method comprises entering IoTEEA 501, such as myName@1kiot.com@@/iot/home/kitchen/dishwasher into a newly purchased dishwasher 502 by a home owner, The method further comprises connecting to the home owner's email account automatically by the dishwasher according to IoTEEA. The method further comprises exchanging the public cryptographic keys between the dishwasher and the home owner's email account 503 and reporting the dishwasher's IP address to complete the setup. The method further comprises displaying the dishwasher status and issuing commands 504 by the home owner to use a mobile phone 505 through home owner's email account. In case of the house is sold to another person, simply changes the IoTEEA in the dishwasher to the new home owner's email address by the original home owner after two-factor authentication to let the new owner customize the rest of information. This rapidly changing device ownership (who can use the device) also works well for apartment renting businesses. In the event tenant one is moving out and tenant two will move in, the apartment owner can make a new IoTEEA such as owner@apartment1234.com@@/iot/apartment/kitchen/dishwasher@@@<tenant>tenantTwo@1kiot.com</tenant> then set it in the dishwasher from owner's email account to let tenant two receive status report and issue commands. Since the apartment owner stays same, no authentication is necessary.

Figure 6:
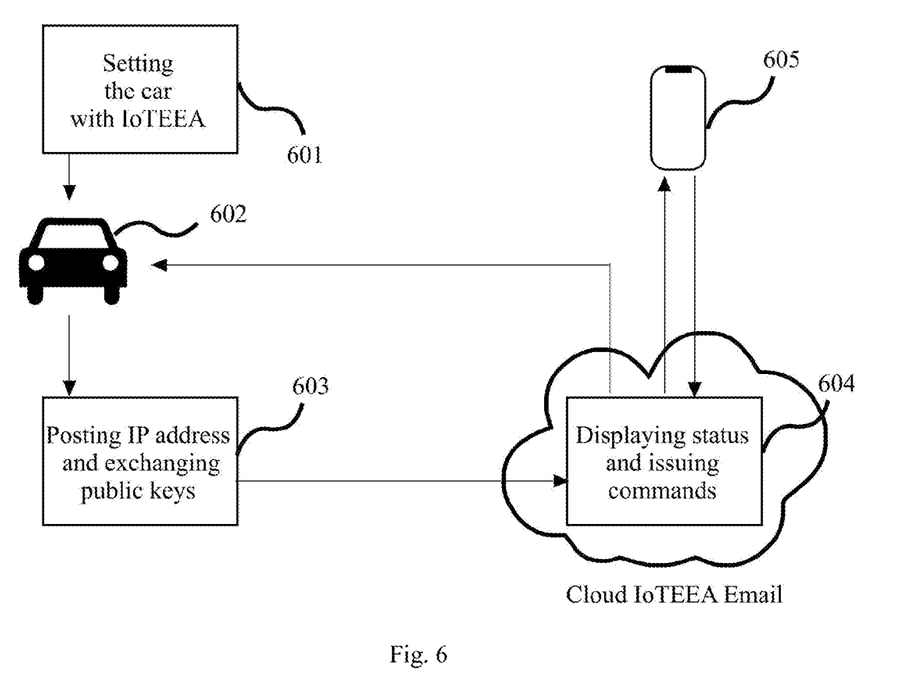
FIG. 6 shows reporting car status to the IoTEEA email system and mobile devices.

FIG. 6 is a schematic illustration of the method for smart car. According to another embodiment, a method comprises entering IoTEEA, such as myName@1kiot.com@@/iot/ auto/ford 601 into a car 602 connected to internet by a car owner. The method further comprises exchanging the public cryptographic keys and report car's IP address 603 to complete the setup between the smart car and the car owner's email account. The method further comprises sending a complete status report from all car systems 604 to the car owner's email account by the smart car. The method further comprises displaying the car status from a mobile phone 605. Then the car owner can decide whether to automatically forward the data collected from the car to the car repair shop. If the car owner sells the car to a person, the car owner simply changes the IoTEEA to the person's IoTEEA from the car owner's email account after security authentication.

Figure 7:
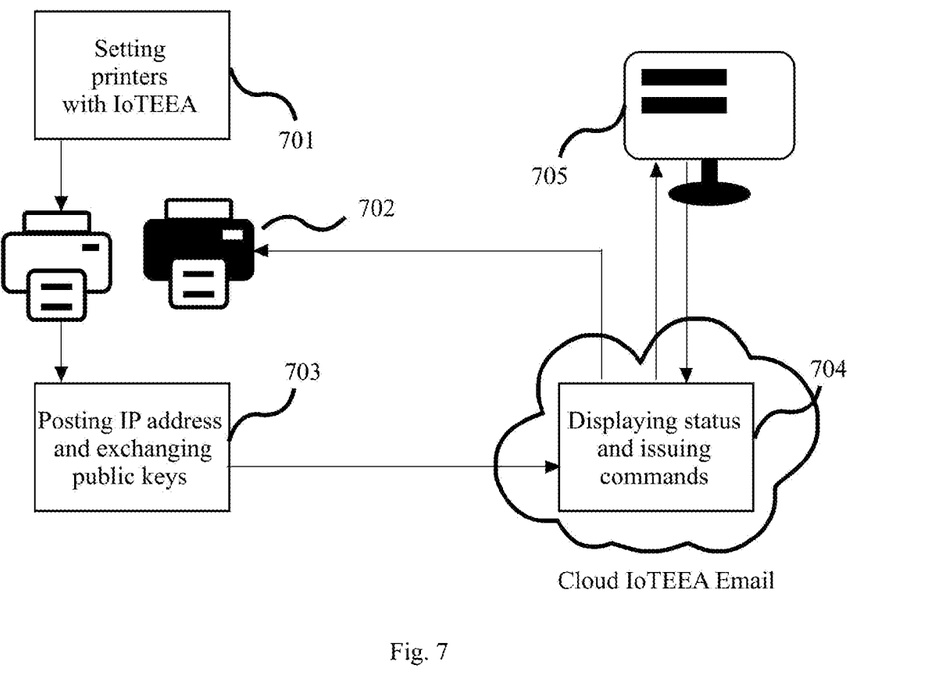
FIG. 7 illustrates the IoTEEA email system configuration for smart businesses.

FIG. 7 is a schematic illustration of the method for smart office. According to another embodiment for the enterprise sector, a method comprises entering IoTEEA, such as secretary@newspaper1234.com@@/iot/sales/printer10 701 into a laser printer 702 connected to the company intranet by a technician. The email address in the IoTEEA belongs to the department secretary. The method further comprises exchanging the public cryptographic keys 703 automatically between the printer and the secretary's email account and reporting printer IP address to complete the setup. The method further comprises sending a status report from the printer to the secretary's email account 704 by the printer device such as a printer toner low message. The method further comprises displaying the printer status in the secretary's monitor screen 705.

Figure 8:
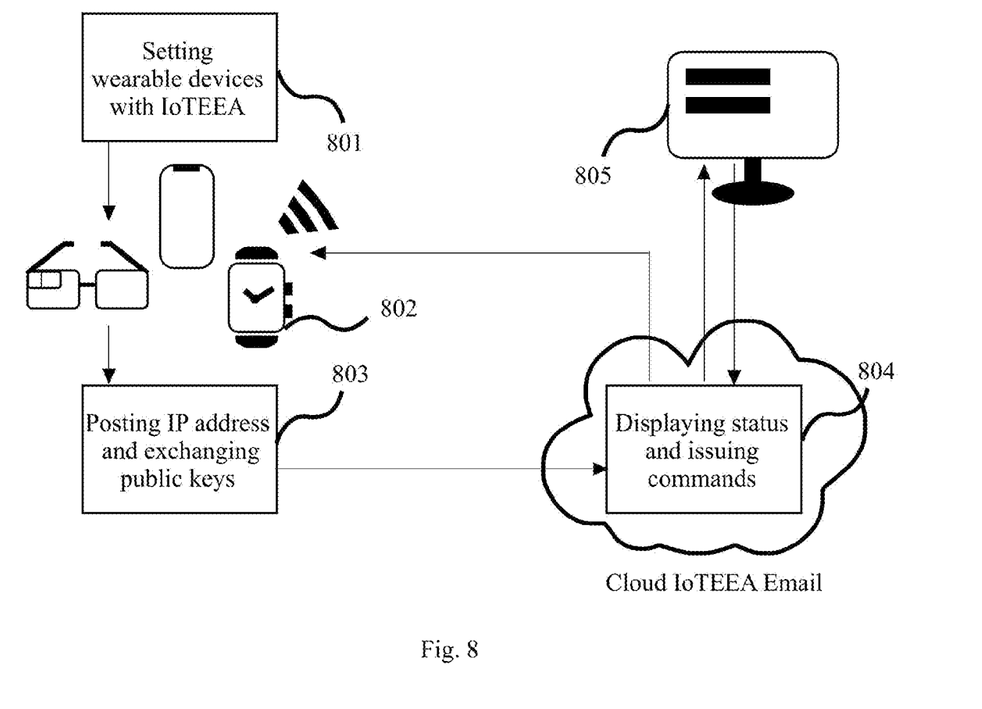
FIG. 8 illustrates a flowchart for wearable IoT devices using IoTEEA.

FIG. 8 is a schematic illustration of the method for wearable devices. According to another embodiment, a method comprises entering IoTEEA, such as myName@1kiot.com@@/iot/devices/watch/myWatch 801 into a wearable device 802 connected to internet or wearable device software on a mobile phone by a person. The method further comprises reporting the wearable device IP address and exchanging the public cryptographic keys 803 to complete the setup between the wearable device and the person's email account. The method further comprises sending status reports and videos as RESTful resources by using RESTful API from the device to the person's email account 804. The method further comprises displaying the wearable device status from a computer screen 805 through the person's email account.

Figure 9:
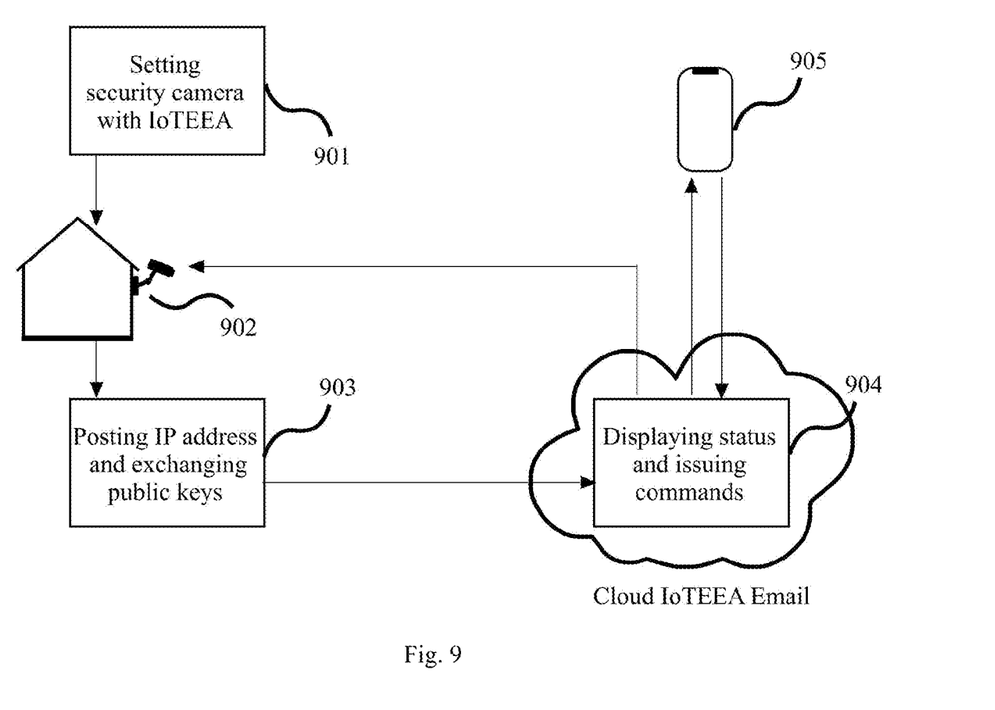
FIG. 9 shows a flowchart for home security devices using the IoTEEA email system.

FIG. 9 is a schematic illustration of the method for smart home. According to another embodiment, a method comprises entering IoTEEA, such as myName@1kiot.com@@/iot/home/security/camera1 901 into a security camera 902 connected to internet by a home owner. The method further comprises exchanging the public cryptographic keys and reporting the device IP address 903 to complete the setup between the security camera and the home owner's email account. The method further comprises sending video from the security camera to the home owner's email account 904 when the AI powered camera identifies a security situation. The method further comprises displaying the security camera status and videos from a mobile phone 905 through the person's email account.

The invention claimed is:
1. A computers-implemented method comprising an email system based on unique identifier in email address format for preventing spam email from reaching the email system, comprising:
   a processor configured to execute the following steps in the email system:

creating an email having zero or a plurality of attachment files by a sender of the email system to a plurality of recipient email addresses;
generalizing both the sender email address and the plurality of recipient email addresses to generalized email addresses by removing the original meaning of local part and domain part from every email address;
bypassing regular email gateways, servers, and Simple Mail Transfer Protocol (SMTP) to send the email having zero or a plurality of attachment files to a controller;
saving the email having zero or a plurality of attachment files with a unique email id to a database in the email system for later retrieval;
searching each recipient generalized email address in a generalized email address table in the database to create a search result;
determining each recipient generalized email address as an external recipient generalized email address for the recipient generalized email address not in the email system or an internal recipient generalized email address for the recipient generalized email address in the email system based on the search result;
restoring the sender generalized email address and each external recipient generalized email address to regular email address by adding the original meaning of local part and domain part;
sending a regular email of join system request to each external recipient regular email address through the regular email service;
verifying a contact connection with the sender for each recipient of the internal recipient generalized email addresses;
issuing the contact connection request to each internal recipient generalized email address if the recipient of the internal recipient generalized email address has no contact connection with the sender;
allowing each recipient in the email system to establish contact connection with the sender if the recipient has no contact connection with the sender;
forwarding a notification of the email having zero or a plurality of attachment files to each internal recipient generalized email address if the recipient of the internal recipient generalized email address has the contact connection with the sender;
omitting regular email gateways, servers, Post Office Protocol 3 (POP3), and Internet Message Access Protocol (IMAP) to let each recipient of the internal recipient generalized email addresses retrieve the email having zero or a plurality of attachment files with the unique email id directly from the controller if the recipient has the contact connection with the sender;
skipping regular email gateways, servers, Simple Mail Transfer Protocol (SMTP), Post Office Protocol 3 (POP3), and Internet Message Access Protocol (IMAP) from the email system by the processor;
opening an email account in the email system with an email address by a user;
designating a sub folder under the root folder of the email account for an IoT device by the user;
creating an Internet of Things Enabled Email Address, IoTEEA by concatenating the email address, a delimiter, the sub folder path as the IoT device name and the IoT device email address by the processor;
concatenating a second delimiter, and other information as a single string to define the user as the owner of the IoT device and the sub folder as the data folder of the IoT device, and the other information as the IoT device operation information by the processor;

setting the IoTEEA into the memory of the IoT device by the user;

connecting to the email account once on the internet for sending a request based on the email account, sub folder, and domain information from the IoTEEA by the IoT device automatically;

approving the request by the user;

exchanging security and other information including the IoT device IP address between the email account and the IoT device by the processor;

sending commands or software updates to the IoT device from the email account by the processor;

receiving the IoT device status and data to the email account by the processor;

performing a security authentication process with extra layers of information to notify the user for preventing unauthorized IoT device ownership change when the email address in the IoTEEA of the IoT device needs to be changed by the processor.

2. The method as claimed in claim 1, wherein the email system uses RESTful resources communicating over Hypertext Transfer Protocol (HTTP).

3. The method as claimed in claim 1, wherein the delimiter is a text string of "@@" and the second delimiter is a text string of "@@@".

4. The method as claimed in claim 1, wherein the security authentication process is Two-Factor Authentication (2FA) rather than an authentication method depends on single-factor to provide a higher level of security such as two pieces of information, a user's password and a six-digit verification code.

5. The method as claimed in claim 1, wherein the email system further comprises providing an ability to let an IoT device software developer open a developer email account for developing and testing a customized IoT device application then loading the customized IoT device application to the email system for all users.

6. The method as claimed in claim 1, wherein the email system further comprises letting the user choose a default controller for the IoT device.

7. The method as claimed in claim 1, wherein the email system further comprises using a RESTful API for standardizing the flow of information between the IoT device and the email system.

8. The method as claimed in claim 1, wherein the email system further comprises supporting end-to-end encryption (E2EE) by both the email system and the IoT device.

9. The method as claimed in claim 1, wherein the email system further comprises letting the user update the IoTEEA in the IoT device from the email account after the IoT device connected to the email account.

* * * * *